(12) United States Patent
Yasumoto et al.

(10) Patent No.: US 7,613,399 B2
(45) Date of Patent: Nov. 3, 2009

(54) OPTICAL TRANSMISSION SYSTEM, OPTICAL TRANSMITTER, AND OPTICAL RECEIVER

(75) Inventors: Hideo Yasumoto, Osaka (JP); Hiroyuki Sasai, Osaka (JP)

(73) Assignee: Panasonic Corporation, Osaka (JP)

( * ) Notice: Subject to any disclaimer, the term of this patent is extended or adjusted under 35 U.S.C. 154(b) by 497 days.

(21) Appl. No.: 11/503,181

(22) Filed: Aug. 14, 2006

(65) Prior Publication Data

US 2007/0041731 A1 Feb. 22, 2007

(30) Foreign Application Priority Data

Aug. 18, 2005 (JP) ............................. 2005-237152

(51) Int. Cl.
*H04B 10/00* (2006.01)

(52) U.S. Cl. ...................................... 398/154; 398/158

(58) Field of Classification Search ................... 398/74, 398/75, 77, 98, 154, 158, 184, 185, 189–194, 398/199, 208
See application file for complete search history.

(56) References Cited

U.S. PATENT DOCUMENTS 5,424,532 A * 6/1995 Occheto et al. ............. 250/221

7,423,564 B2 * 9/2008 Kitayama et al. ........... 341/137
2004/0062556 A1 * 4/2004 Kubo et al. ................. 398/208
2005/0286908 A1 * 12/2005 Way ........................... 398/186

FOREIGN PATENT DOCUMENTS

| JP | 08-079186 | 3/1996 |
|----|-----------|--------|
| JP | 2004-112235 | 4/2004 |

* cited by examiner

*Primary Examiner*—Dalzid Singh
(74) *Attorney, Agent, or Firm*—Wenderoth, Lind & Ponack, L.L.P.

(57) ABSTRACT

In order to improve a transmission speed of multilevel light transmission, increasing the number of light emitting elements is effective. However, in a method in which light outputs from a plurality of light emitting elements are added, because common mode noise contained in the light outputs is added, deterioration in transmission quality caused by the common mode noise prominently arises. Therefore, a difference between two light outputs is previously assigned to data to be transmitted. Specifically, an optical transmitter 102 converts data Dt to multilevel optical signals OSm1 and OSm2 and transmits the converted multilevel optical signals to an optical receiver 103. The optical receiver 103 restores the data Dt which is previously assigned to a difference between electrical signals ESr1 and ESr2 converted from the multilevel optical signals OSm1 and OSm2.

13 Claims, 8 Drawing Sheets

| Dt | | Dmc1 | Dmc2 |
|---|---|---|---|
| INPUT DATA SEQUENCE | CONVERSION CODE | OUTPUT TO DRIVER 121 | OUTPUT TO DRIVER 122 |
| 000 | a0-b0 | a0 | b0 |
| 001 | a0-b1 | a0 | b1 |
| 010 | a0-b2 | a0 | b2 |
| 011 | a1-b0 | a1 | b0 |
| 100 | a1-b1 | a1 | b1 |
| 101 | a1-b2 | a1 | b2 |
| 110 | a2-b0 | a2 | b0 |
| 111 | a2-b1 | a2 | b1 |
| — | a2-b2 | a2 | b2 |

TRANSMITTING END          RECEIVING END

OPTICAL TRANSMISSION SYSTEM, OPTICAL TRANSMITTER, AND OPTICAL RECEIVER

BACKGROUND OF THE INVENTION

1. Field of the Invention

The present invention relates to an optical transmission system, an optical transmitter, and an optical receiver. More particularly, the present invention relates to an optical transmission system in which data is multilevel-coded and the multilevel-coded data is transmitted, an optical transmitter and an optical receiver which the system comprises.

2. Description of the Background Art

In a field of optical communications, as a technique of increasing a transmission speed, TDM (time division multiplexing) and WDM (wavelength division multiplexing) have generally been known.

In addition, as a technique of enhancing a frequency utilization efficiency and of realizing an increase in a transmission speed, multilevel optical transmission in which an amplitude or a phase are multilevel-coded and the multilevel-coded signals are transmitted has been known. In particular, a method of assigning a multilevel code to an amplitude level of a transmitted signal by modulating intensity of light emitted from a light source is, as compared to a method of assigning a multilevel code to a phase, advantageous in that configurations of a transmitter and a receiver can be simplified.

Conventionally, as the method of assigning a multilevel code to an amplitude, a method of using a single light emitting element (for example, refer to Japanese Laid-Open Patent Publication No. 8-79186) and a method of using a plurality of light emitting elements (for example, refer to Japanese Laid-Open Patent Publication No. 2004-112235) have been known. Hereinafter, the both methods will be described.

FIG. 11 is a diagram explaining a multilevel optical signal transmission method in which a single light emitting element is used.

In FIG. 11, a transmitter and receiver circuit 760 comprises a D/A converter circuit 700, a light emitting element 710, an optical fiber 720, a photo-detecting element 730, an amplifier 740, and an A/D converter circuit 750.

First, on a transmitting end, the D/A converter circuit 700 converts a combination of digital signals inputted from a plurality of channels to multi-valued logic levels and generates an analog signal in accordance with the converted logic levels. The light emitting element 710 receives the analog signal outputted from the D/A converter circuit 700 and electric-optic-converts the received analog signal. The light emitting element 710 outputs to the optical fiber 720 an optical signal obtained through the electric-optic conversion.

Next, on a receiving end, the photo-detecting element 730 receives the optical signal outputted from the optical fiber 720 and generates an electrical signal in accordance with intensity of the received optical signal. The amplifier 740 amplifies the electrical signal outputted from the photo-detecting element 730 and outputs the amplified electrical signal to the A/D converter circuit 750. The A/D converter circuit 750 A/D-converts the electrical signal outputted from the amplifier 740 to a digital signal and restores a plurality of digital signals.

FIG. 12 is a diagram explaining a method of transmitting a multilevel optical signal, in which a plurality of light emitting elements are used.

In FIG. 12, an optical transmitter 860 comprises a driver circuit 800 which receives binary signals from four channels and light emitting elements 811 to 814 which are assigned to the four channels.

A driver circuit 800 drives the light emitting elements 811 to 814 in a separate manner so that the light emitting elements 811 to 814 light up or light out respectively. And the driver circuit 800 drives the light emitting elements 811 to 814 whose levels of light-output power level vary respectively. Accordingly, the optical transmitter 860 is capable of outputting 16 kinds of multilevel optical signals, each of which has varying light intensity in accordance with 16 kinds of combinations of lighting-on and lighting-out of the light emitting elements 811 to 814.

However, the above-mentioned multilevel optical signal transmission methods have the following problems, respectively.

Firstly, when the single light emitting element is used for generating multilevel optical signals, because a number of multilevels which can be set in reality is limited, increasing a transmission speed has limitation. Hereinafter, a designing method of multilevels will be described in detail.

FIG. 13 is a diagram showing a current-light intensity characteristic of a semiconductor laser.

As shown in FIG. 13, a curve indicating intensity of light outputted from the semiconductor laser is linear in a region A where an amount of supplied current is equal to or less than a given value, whereas a curve indicating intensity of light outputted from the semiconductor laser is non-linear in a region B where an amount of supplied current exceeds the given value. A reason why the curve indicating the intensity of light outputted from the semiconductor laser is non-linear in the region B is that the output from the semiconductor laser is saturated.

Therefore, as a first condition, it is required that in order to vary the intensity of the optical signals in accordance with a change in a waveform of each of electrical signals, a plurality of light intensity levels P0 to P4 are set to be less than P5 which is a maximum of light intensity in the region A.

Further, as a second condition, a characteristic of an optical receiver is required to be considered. In general, noise generated in the optical receiver increases as intensity of an optical signal received by the optical receiver increases. Therefore, it is favorable that in order to reduce influence of the noise on the optical signal and facilitate identification of the optical signal levels, levels are designed so that a difference between two adjacent levels increases as the intensity of the optical signal increases. For example, as shown in FIG. 13, the levels are designed so that the intensity of outputted light P0 to P5 satisfy a relationship shown by the following inequality.

$$P5-P4>P4-P3>\ldots>P1-P0$$

However, even if the levels are designed so as to satisfy the above-mentioned first and second conditions, in a range of the light intensity of which curve is linear (in the region A in FIG. 13), a plurality of multilevels concentrate in a range in which the intensity of outputted light is low.

When the light emitting element is a semiconductor laser or an LED, a response bandwidth is narrowed as a bias current supplied to the light emitting element decreases. Therefore, when the light emitting element is driven with a low bias current, a response bandwidth of a light source is insufficient as compared to a modulation bandwidth of an inputted signal. As a result, interference among multilevels, which is caused by waveform distortion (closure of an eye pattern), accrues, leading to deterioration in transmission quality.

Therefore, when the multilevel optical signals are generated by a single light emitting element, a number of levels which can be set in a range in which a curve of the intensity of outputted light is linear is limited in reality.

Secondly, when a plurality of light emitting elements are used for generating multilevel optical signals, there accrues a problem of deterioration in transmission quality, which is caused by common mode noise.

Specifically, for example, in the optical transmitter shown in FIG. 12, if noise is generated, the generated noise is likely to be contained as common mode noise in optical signals outputted from the respective light emitting elements. On the other hand, the optical receiver receives the optical signals outputted the respective light emitting elements in a collective manner and outputs electrical signals in accordance with intensity of the received optical signals. As a result, because the optical receiver photoelectric-converts the optical signals in which common mode noise contained in light outputted from the respective light emitting elements are added, influence of the common mode noise increases, leading to deterioration in transmission quality.

SUMMARY OF THE INVENTION

Therefore, an object of the present invention is to provide an optical transmission system which is capable of improving a transmission speed by increasing a number of multilevels and of reducing deterioration in transmission quality, which is caused by common mode noise, an optical transmitter and an optical receiver which the system comprises.

A first aspect of the present invention is directed to the optical transmission system in which data is multilevel-coded and the multilevel-coded data is transmitted. The optical transmission system comprises the optical transmitter and the optical receiver.

More particularly, the optical transmitter includes a driving section for converting the data to a first multilevel code and a second multilevel code, a difference between the first multilevel code and the second multilevel code being previously assigned to the data, a first light emitting section for outputting a first multilevel optical signal having intensity corresponding to the first multilevel code, and a second light emitting section for outputting a second multilevel optical signal having intensity corresponding to the second multilevel code.

On the other hand, the optical receiver includes a first photo-detecting section for receiving the first multilevel optical signal and converting the first multilevel optical signal to a first electrical signal, a second photo-detecting section for receiving the second multilevel optical signal and converting the second multilevel optical signal to a second electrical signal, and a decoding section for decoding the data which is previously assigned to a difference between the first electrical signal and the second electrical signal.

In such a configuration, the optical transmitter converts the data to be transmitted to a combination of the first multilevel code and the second multilevel code and outputs the first multilevel optical signal and the second multilevel optical signal respectively corresponding to the first multilevel code and the second multilevel code. Therefore, in the optical transmission system according to the present invention, a large number of levels of a multilevel optical signal can be set, as compared with a multilevel optical transmission system which has a single light source, thus allowing an increase in a transmission speed.

In addition, the data to be transmitted is previously determined so as to correspond to a difference between the first multilevel code and the second multilevel code. In order to decode the transmitted data, the optical receiver calculates a difference between the two electrical signals converted from the two multilevel optical signals. As a result, even if common mode noise is generated in the driving section or a transmission path, common mode noise contained in the two multilevel optical signals is offset, thus improving transmission quality.

The first light emitting section may intensity-modulate the first multilevel signal using M levels (M is an integer equal to or greater than 3) or light-output power level, the second light emitting section may intensity-modulate the second multilevel signal using N levels (N is an integer equal to or greater than 3) of light-output power level, and the decoding section may detect a difference between an amplitude of the first electrical signal and an amplitude of the second electrical signal.

In such a configuration, by appropriately setting M values and N values, coding of (M×N) values at maximum can be realized.

In addition, it is preferable that the first multilevel code is an M level code which has M values (M is an integer equal to or greater than 3) and the M values are set so that a difference between any two values selected from the M values is different from each other.

In such a configuration, since the first multilevel codes are set so as to be different from each other, efficiency of coding is improved.

Further, it is preferable that the second multilevel code is an N level code which has N values (N is an integer equal to or greater than 3) and the N values are set so that a difference between any two values selected from the N values is different from each other.

In such a configuration, since the second multilevel codes are set so as to be different from each other, efficiency of coding is improved.

The first multilevel code may be an M level code which has M values (M is an integer equal to or greater than 3), the second multilevel code may be an N level code which has N values (N is an integer equal to or greater than 3), and the M values and the N values may be set so that a difference between one positive value selected from the M values and one positive value selected from the N values is uniquely defined.

In such a configuration, since a difference between the first multilevel code and the second multilevel code is uniquely defined, a maximum efficiency of coding is enabled.

The first multilevel optical signal and the second multilevel optical signal are multiplexed. The receiver may further include a separation section for separating the first multilevel optical signal and the second multilevel optical signal from each other.

In such a configuration, since it is not required that the first multilevel optical signal and the second multilevel optical signal are separately transmitted, design freedom of a configuration of the optical transmission system is expanded.

The first light emitting section emits light having a first wavelength and the second light emitting section emits light having a second wavelength which is different from the first wavelength. The separation section may include a first wavelength filter, which is arranged so as to cover the first photo-detecting section, for transmitting the light having the first wavelength and a second wavelength filter, which is arranged so as to cover the second photo-detecting section, for transmitting the light having the second wavelength.

In such a configuration, separating the first multilevel optical signal and the second multilevel optical signal is enabled. And ambient light other than the first multilevel optical signal and the second multilevel optical signal can be removed.

And at least one of the first wavelength and the second wavelength may be contained in a visible light area.

In such a configuration, visible light emitted from the optical transmitter can be utilized as guide light for adjusting an optical axis. And an optical transmission system which has both a function of a communications apparatus and a function of a lighting apparatus can be realized.

The first light emitting section emits light having a first polarization plane and the second light emitting section emits light having a second polarization plane which is perpendicular to the first polarization plane. And the separation section may include a first polarization filter, which is arranged so as to cover the first photo-detecting section, for transmitting light having the first polarization plane and a second polarization filter, which is arranged so as to cover the second photo-detecting section, for transmitting light having the second polarization plane.

In such a configuration, separating the first multilevel optical signal and the second multilevel optical signal is enabled. And influence of ambient light and reflected light, other than the first multilevel optical signal and the second multilevel optical signal, which causes noise, can be reduced.

The first light emitting section and the second light emitting section may each include either one of a semiconductor laser and a light emitting diode.

In such a configuration, high speed modulation of several ten mega bps to several giga bps can be attained.

The driving section may drive the first light emitting section and the second light emitting section at modulation speed which are different from each other.

In such a configuration, a light emitting element which is driven at a slow modulation speed and is cheap can be used as one of the light emitting sections, thereby allowing a cost reduction in manufacturing the optical transmission system.

A second aspect of the present invention is directed to an optical transmitter operable to multilevel-code data to be transmitted and to transmit the multilevel-coded data, the optical transmitter comprising: a driving section for converting a first multilevel code and a second multilevel code, a difference between the first multilevel code and the second multilevel code being previously assigned to the data; a first light emitting section for outputting a first multilevel optical signal having intensity corresponding to the first multilevel code; and a second light emitting section for outputting a second multilevel optical signal having intensity corresponding to the second multilevel code.

In such a configuration, setting a large number of multi-levels is enabled, as compared with a multilevel optical transmission system having a single light source, thus allowing an increase in a transmission speed.

A third aspect of the present invention is directed to an optical receiver operable to receive multilevel-coded data. The optical receiver comprises: a first photo-detecting section for receiving the first multilevel optical signal and converting the first multilevel optical signal to a first electrical signal; a second photo-detecting section for receiving the second multilevel optical signal and converting the second multilevel optical signal to a second electrical signal; and a decoding section for decoding the data which is previously assigned to a difference between the first electrical signal and the second electrical signal.

In such a configuration, common mode noise which is generated in the driving section and a transmission path is offset, thus improving transmission quality.

In the optical transmitter according to the present invention, since the data to be transmitted corresponds to a difference between the multilevel optical signals, the transmitted data is decoded by obtaining a difference between the two multilevel optical signals. Hence, an optical transmission system in which a transmission speed is increased and an S/N ratio is improved by offsetting common mode noise during the data decoding can be realized.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figures 1, 2:
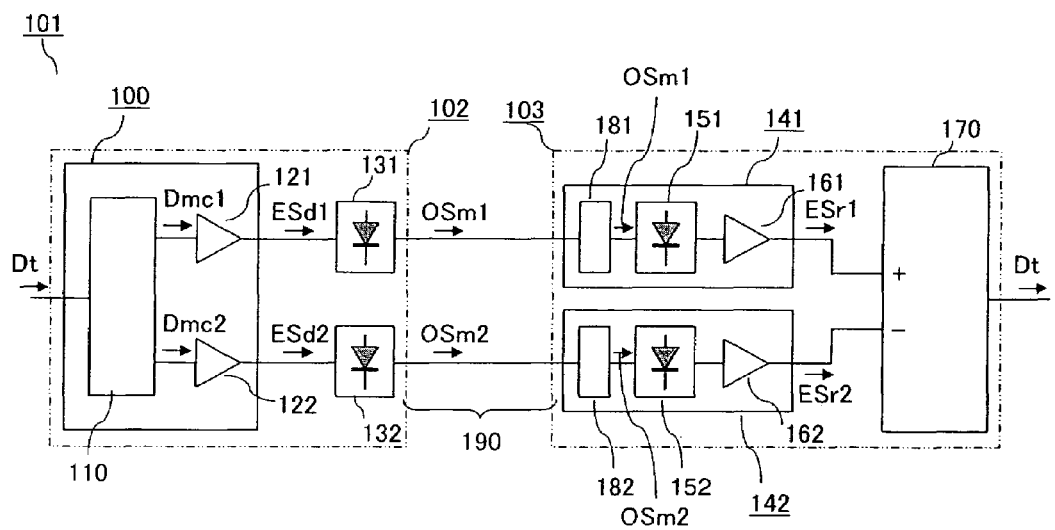
FIG. 1 is a functional block diagram illustrating a schematic configuration of an optical transmission system according to a first embodiment of the present invention.
FIG. 2 is a diagram showing an example of a code conversion table stored in a driving section.

FIG. 1 is a functional block diagram illustrating a schematic configuration of an optical transmission system according to a first embodiment of the present invention. FIG. 2 is a diagram showing an example of a code conversion table stored in a driving section.

An optical transmission system 101 comprises an optical transmitter 102 and an optical receiver 103. The optical transmitter 102 converts data Dt to be transmitted to two multilevel optical signals OSm1 and OSm2 and outputs the two converted optical signals. The optical receiver 103 decodes the data Dt based on an intensity difference between the two multilevel optical signals OSm1 and OSm2 received via a transmission medium 190. The transmission medium 190 is, for example, an optical fiber, an optical waveguide, and a free space.

The optical transmitter 102 includes a driving section 100, a first light emitting section 131, and a second light emitting section 132. The driving section 100 includes a multilevel signal generation section 110 and drivers 121 and 122. An oscillation wavelength of the first light emitting section 131 is different from an oscillation wavelength of the second light emitting section 132.

On the other hand, the optical receiver 103 includes a first photo-detecting section 141, a second photo-detecting section 142, and a decoding section 170. The first photo-detecting section 141 includes a first wavelength filter 181, a first photo-detecting element 151, and an amplifier 161, and the second photo-detecting section 142 includes a second wavelength filter 182, a second photo-detecting element 152, and an amplifier 162. The first wavelength filter 181 transmits light having an oscillation wavelength of the first light emitting section 131 and the second wavelength filter 182 transmits light having an oscillation wavelength of the second light emitting section 132.

Hereinafter, the above-mentioned respective components will be further described in detail along a flow of data transmission in the optical transmission system 101. In order to facilitate understanding, a first multilevel code Dmc1 and a second multilevel code Dmc2 show light-output power level of the first light emitting section 131 and light-output power level of the second light emitting section 132.

First, multilevel optical signal processing by means of the optical transmitter 102 will be described.

The multilevel signal generation section 110 in the driving section 100 receives data Dt to be transmitted and converts, in accordance with a code conversion table, the received data Dt to a first multilevel optical signal OSm1 and a second multilevel optical signal OSm2.

In FIG. 2, in the code conversion table which the driving section 100 holds, combinations of the first multilevel code Dmc1 outputted to the driver 121 and the second multilevel code Dmc2 outputted to the driver 122 are previously defined with respect to respective pieces of data of a predetermined number of bits. In particular, the first multilevel code Dmc1 and the second multilevel code Dmc2 are defined so that a difference between the first multilevel code Dmc1 and the second multilevel code Dmc2 uniquely corresponds to data. Specifically, as shown in FIG. 2, conversion codes which differ from each other and are respectively equal to difference values between the first multilevel code Dmc1 and the second multilevel code Dmc2 are respectively assigned to 3-bit input data sequences.

Here, a case where data to be transmitted is serial data is assumed. The multilevel signal generation section 110 converts each 3 sequential bits of the data to a conversion code. And the multilevel signal generation section 110 generates the first multilevel code Dmc1 (either one of a0, a1, and a2) and the second multilevel code Dmc2 (either one of b0, b1, and b2) which are previously determined so that a difference between the first multilevel code Dmc1 and the second multilevel code Dmc2 is respectively equal to a conversion code.

As an example, a case where as a part of data Dt to be transmitted, an input data sequence "010" is inputted is assumed. In accordance with the code conversion table shown in FIG. 2, the multilevel signal generation section 110 generates a first multilevel code a0 and a second multilevel code b2 which are previously assigned to a conversion code (a0-b2) corresponding to the input data sequence "010".

The multilevel signal generation section 110 outputs the generated first multilevel code Dmc1 to the driver 121 and the generated second multilevel code Dmc2 to the driver 122.

In the meantime, the data Dt to be transmitted does not necessarily have to be serial data and may be parallel data.

Next, the driver 121 generates a first driving signal ESd1 for driving the first light emitting section 131 based on the first multilevel code Dmc1 outputted from the multilevel signal generation section 110. Similarly, the driver 122 generates a second driving signal ESd2 for driving the second light emitting section 132 based on the second multilevel code Dmc2 outputted from the multilevel signal generation section 110.

Next, the first light emitting section 131 electric-optic-converts the first driving signal ESd1 outputted from the driver 121 and outputs a first multilevel optical signal OSm1 having intensity in accordance with the first multilevel code Dmc1. Similarly, the second light emitting section 132 electric-optic-converts the second driving signal ESd2 outputted from the driver 122 and outputs a second multilevel optical signal OSm2 having intensity in accordance with the second multilevel code Dmc2. The first multilevel optical signal OSm1 and the second multilevel optical signal OSm2 are transmitted, via the transmission medium 190, to the optical receiver 103.

Next, multilevel optical signal processing by means of the optical transmitter 103 will be described.

The first photo-detecting section 141 receives the first multilevel optical signal OSm1 and converts the received first multilevel optical signal OSm1 to a first electrical signal ESr1. More specifically, in the first photo-detecting section 141, the first wavelength filter 181 transmits, among optical signals transmitted through the transmission medium 190, only the first multilevel optical signal OSm1 having the oscillation wavelength of the first light emitting section 131 and removes the second multilevel optical signal OSm2 through absorption or reflection. The first photo-detecting element 151 photo-electric-converts light transmitted through the first wavelength filter 181. And the amplifier 161 amplifies an output signal from the first photo-detecting element 151 and outputs the amplified signal as a first electrical signal ESr1 to the decoding section 170.

Similarly, in the second photo-detecting section 142, the second photo-detecting element 152 photo-electric-converts a second multilevel optical signal OSm2 transmitted through the second wavelength filter 182 and subsequently, the amplifier 162 amplifies an output signal from the second photo-detecting element 152 and outputs the amplified signal as a second electrical signal ESr2 to the decoding section 170.

The decoding section 170 obtains a difference between amplitude levels of the first electrical signal ESr1 and the second electrical signal ESr2. The obtained difference between the amplitude levels corresponds to a conversion code (FIG. 2) each assigned to an input data sequence. The decoding section 170 decodes data Dt assigned to the obtained difference between the amplitude levels and polarity in accordance with the previously prepared code conversion table and outputs the decoded data Dt.

Here, a method of designing levels of the first multilevel optical signal OSm1 and the second multilevel optical signal OSm2 will be described.

Figure 3:
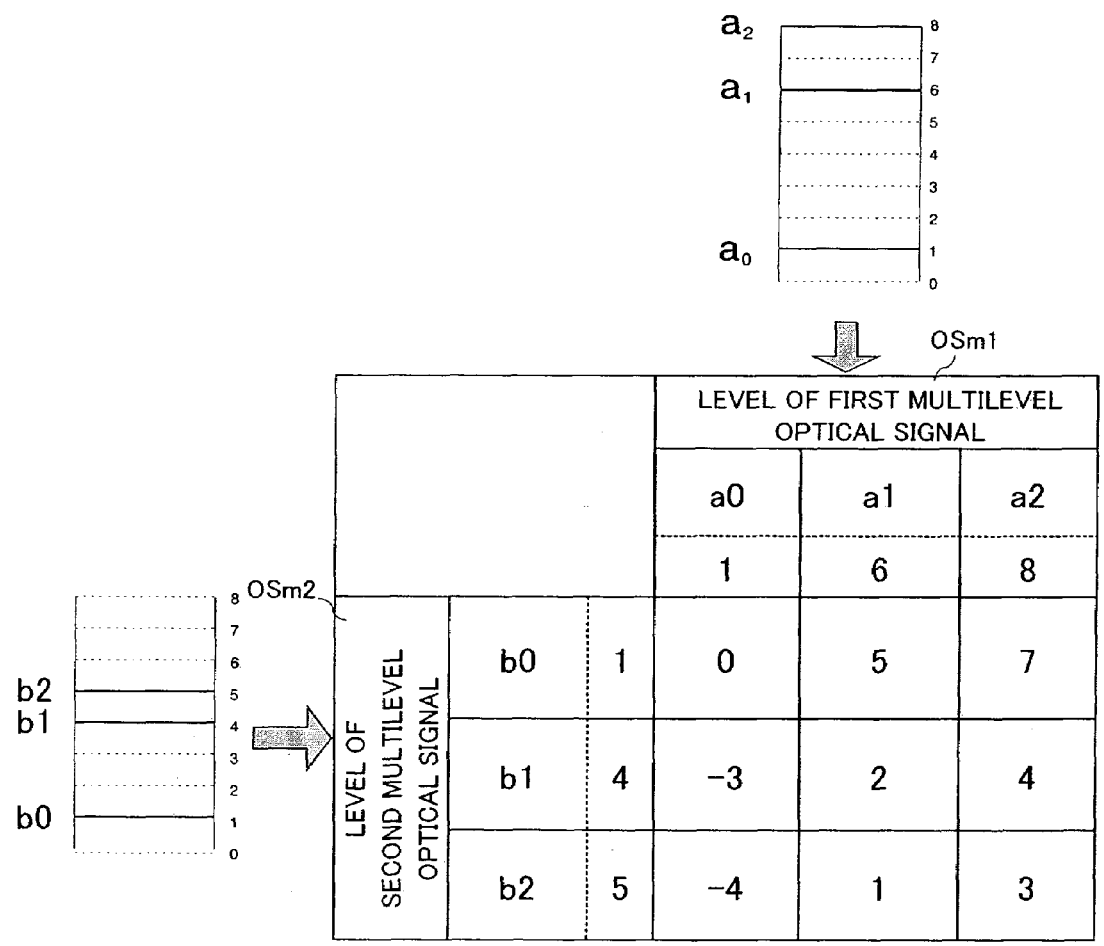
FIG. 3 is a matrix diagram showing combinations of levels of a first multilevel optical signal and levels of a second multilevel optical signal.

FIG. 3 is a matrix diagram showing combinations of levels of the first multilevel optical signal and levels of the second multilevel optical signal.

In FIG. 3, difference values which are obtained by subtracting the respective levels b0 to b2 of the second multilevel optical signal OSm2 from the respective levels a0 to a2 of the first multilevel optical signal OSm1 are shown. In other words, a difference value being positive shows that an output level of the first electrical signal ESr1 detected in the optical receiver 103 is higher than an output level of the second electrical signal. Conversely, a difference value being negative shows that an output level of the first electrical signal ESr1 is lower than an output level of the second electrical signal ESr2. And a difference value being "0" shows that an output level of a first reception signal is substantially equal to an output level of a second reception signal. Further, an absolute value "1" of a difference shows a minimum value which can be discriminated by the decoding section 170 in the optical receiver 103.

As shown in FIG. 3, the levels a0, a1, and a2 of the first multilevel optical signal are set so as to satisfy the following equation (1).

$$a0:a1:a2=1:6:8 \quad (1)$$

Similarly, the levels b0, b1, and b2 of the second multilevel optical signal are set so as to satisfy the following equation (2).

$$b0:b1:b2=1:4:5 \quad (2)$$

Further, the levels a0, a1, and a2 of the first multilevel optical signal are set so that a difference value between two values in any combination is different from all other difference values. In other words, the levels a0, a1, and a2 are set so as to satisfy the following equation (3).

$$(a1-a0):(a2-a0):(a2-a1)=5:7:2 \quad (3)$$

Similarly, the levels b0, b1, and b2 of the second multilevel optical signal are set so that a difference value between two values in any combination is different from all other difference values. In other words, the levels b0, b1, and b2 are set so as to satisfy the following equation (4).

$$(b1-b0):(b2-b0):(b2-b1)=3:4:1 \quad (4)$$

In the present embodiment, the first light emitting section 131 outputs 4 levels (0, a0, a1, and a2) of a multilevel optical signal. Similarly, the second light emitting section 132 outputs 4 levels (0, b0, b1, and b2) of a multilevel optical signal. In the optical receiver, however, as a case where a level of the multilevel optical signal is 0 (when a light emitting element is unlit), assumed is a case where there is no data to be transmitted and a case where a multilevel optical signal outputted from the optical transmitter cannot be received due to some hindrance. Therefore, as shown in FIG. 3, 0 levels of the first multilevel optical signal and the second multilevel optical signal are not assigned for data transmission.

When the first multilevel code Dmc1 and the second multilevel code Dmc2 are designed as described above, any difference between any multilevel which any first multilevel optical signal OSm1 shows and any multilevel which any second multilevel optical signal OSm2 shows is uniquely defined as shown in FIG. 3. Therefore, when the first light emitting section 131 and the second light emitting section 132 respectively output an M value and an N value, transmitting a multilevel signal of a value of $\{(M-1)\times(N-1)\}$ at a maximum is enabled (where M and N are integers equal to or greater than 3).

In addition, since the decoding section 170 decodes the data Dt in accordance with a difference between output levels of the first electrical signal ESr1 and the second electrical signal ESr2, removal of common mode noise resulting from fluctuation in a power supply voltage, jump-in noise or the like in the driving section 100 is enabled.

Furthermore, a method by which the optical transmitter 102 and the optical receiver 103 according to the present embodiment synchronize will be described.

Figure 4:
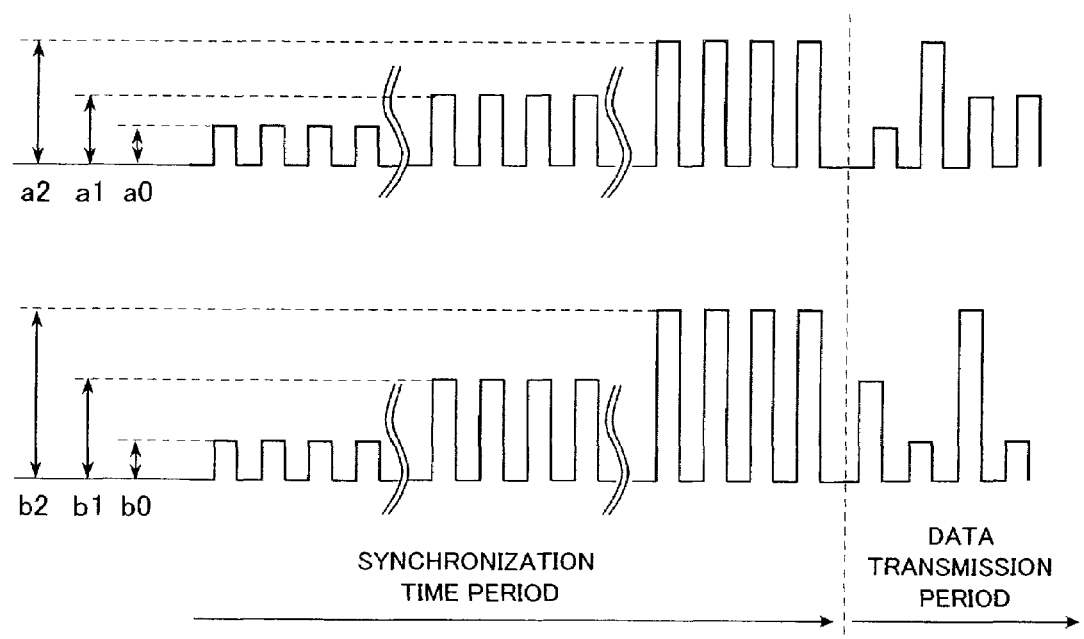
FIG. 4 is a diagram showing an example of a signal outputted by an optical transmitter shown in FIG. 1.

FIG. 4 is a diagram showing an example of a signal outputted by the optical transmitter shown in FIG. 1. In an upper part of FIG. 4, a waveform of a signal outputted from the first light emitting section 131 is shown and in a lower part of FIG. 4, a waveform of a signal outputted from the second light emitting section 132 is shown.

When starting transmission of a multilevel optical signal, the optical transmitter 102 outputs an alternating signal, which repeatedly alternates between a 0 level and a predetermined level of light-output power level, in a predetermined period of synchronization time in order to synchronize with the optical receiver 103.

In particular, in the present embodiment, the first light emitting section 131 and the second light emitting section 132 change amplitudes of synchronization signals in a phased manner. For example, as shown in the upper part of FIG. 4, the first light emitting section 131 outputs first an alternating signal whose amplitude is a0, next an alternating signal whose amplitude is a1, and finally an alternating signal whose amplitude is a2 during the synchronization time period. Similarly, the second light emitting section 132 outputs a synchronization signal whose amplitude changes in a phased manner (in the lower part of FIG. 4).

On the other hand, the optical receiver 103 synchronizes with the optical transmitter 102 based on the detected synchronization signal. Further, in the optical receiver 103, the amplifiers 161 and 162 determine a synchronization ratio based on a maximum amplitude level of the received synchronization signal.

As described above, the optical transmission system 101 according to the present embodiment comprises two light emitting sections, i.e., the first light emitting section 131 and the second light emitting section 132. Thus, the optical transmission system 101 is capable of increasing a number of levels of the multilevel optical signal as compared with an optical transmission system having a single light emitting element, realizing an increase in a transmission speed.

In addition, in the optical transmission system 101 according to the present embodiment, a difference between two multilevel codes is assigned to data to be transmitted. Consequently, in order for the decoding section 170 to decode the data, a difference between the first electrical signal ESr1 and the second electrical signal ESr2 is obtained, whereby common mode noise is offset, leading to an improvement in an S/N ratio. In particular, when the first multilevel code Dmc1 of the M value and the second multilevel code Dmc2 of the N value are designed as shown in FIG. 3, the optical transmission system 101 is capable of transmitting data by using $\{(M-1)\times(N-1)\}$ multilevel signals at maximum (where M and N are integers equal to or greater than 3).

In the first embodiment, although the driving section 100 includes the multilevel signal generation section 110 and the drivers 121 and 122, a configuration of the driving section requires only that the driving section 100 converts data Dt to be transmitted to the first multilevel code Dmc1 and the second multilevel code Dmc2 and respective differences between the first multilevel code Dmc1 and the second multilevel code Dmc2 are assigned to the data Dt to be transmitted.

In addition, in the first embodiment, it is preferable that the first multilevel code Dmc1 and the second multilevel code Dmc2 are set so that respective differences (a2−a1, a1−a0, a2−a1) between two given values selected from the first multilevel code Dmc1 are all different from respective differences (b2−b1, b1−b0, b2−b1) between two given values selected from the second multilevel code Dmc2.

Further, when the first multilevel optical signals OSm1 and OSm2 are equal in intensity, it is preferable that the first photo-detecting element 151 and the second photo-detecting element 152 are substantially equal in photoelectric conversion efficiencies so as to make levels of the first electrical signal ESr1 and the second electrical signal ESr2 equal. And when light-output power level of one of the multilevel optical signals is reduced due to an external factor or the like, in order to compensate for the reduction through controlling a gain by means of the amplifiers 161 and 162, the first photo-detecting section 141 and the second photo-detecting section 142 may further include an AGC (automatic gain control)

Further, the synchronization signal outputted when the optical transmitter 102 starts transmitting the multilevel optical signals is not limited to one shown in the example of FIG. 4. For example, the first light emitting section 131 and the second light emitting section 132 may output alternating signals of two values (0 and a constant level).

Further, although in the first embodiment, values obtained by subtracting the second multilevel code Dmc2 from the first multilevel code Dmc1 are assigned to the data Dt to be transmitted, values obtained by subtracting the first multilevel code Dmc1 from the second multilevel code Dmc2 may be assigned to the data Dt to be transmitted.

Further, in the first embodiment, the first light emitting section 131 and the second light emitting section 132 may output linearly-polarized light having polarization planes which are mutually-perpendicular, instead of outputting light having mutually different oscillation wavelengths. In this case, the first photo-detecting section 141 may include a first polarization filter which transmits light having the same polarization plane as a plane which light outputted by the first light emitting section 131 has, and the second photo-detecting section 142 may include a second polarization filter which transmits light having the same polarization plane as a plane which light outputted by the second light emitting section 132 has.

Second Embodiment

A configuration of a multilevel light transmission system according to a second embodiment of the present invention is similar to that of the first embodiment. However, the multilevel light transmission system according to the second embodiment has a feature in a method of setting a bias current for driving light emitting sections. Hereinafter, the feature of the present embodiment will be described in a focused manner.

Figure 5:
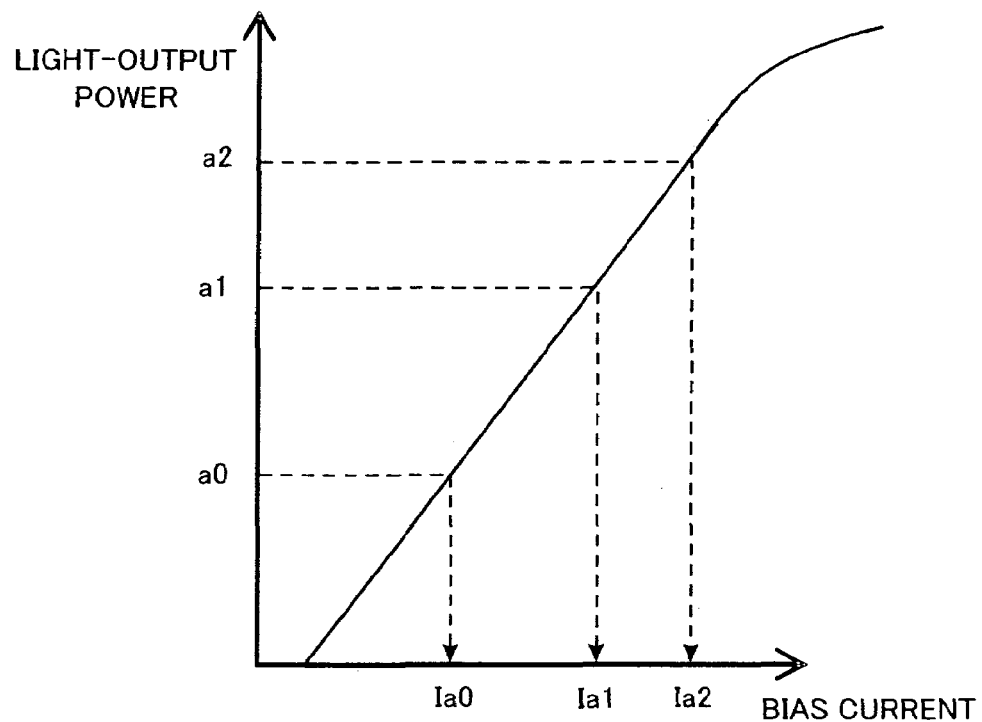
FIG. 5 is a diagram showing a relationship between a bias current supplied to a first light emitting section and a light-output power level of the first light emitting section.
Figure 6:
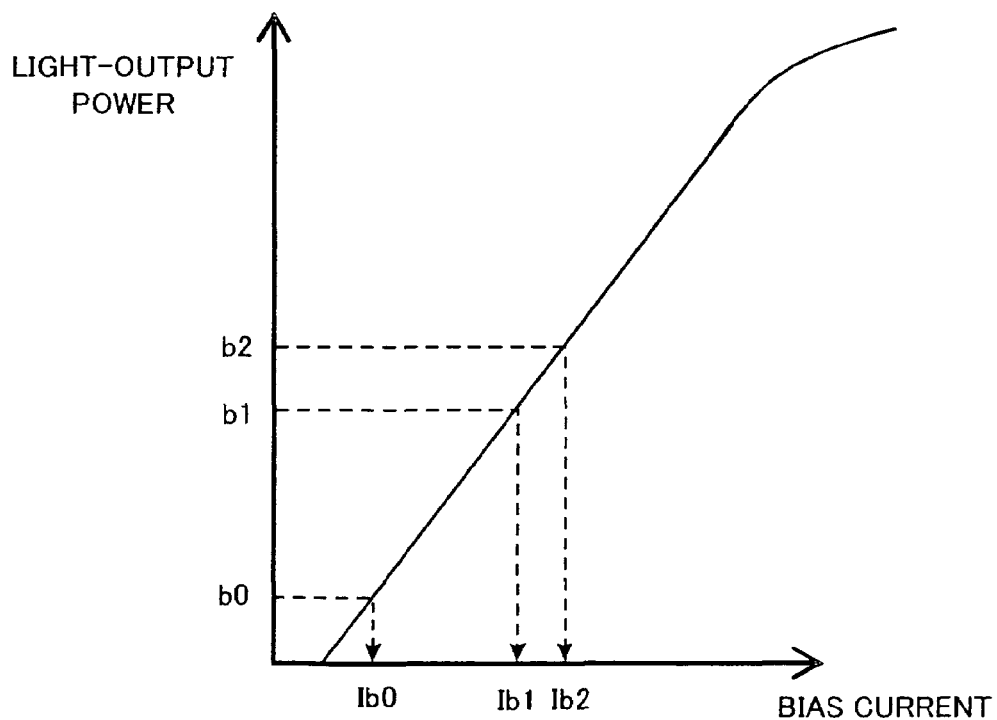
FIG. 6 is a diagram showing a relationship between a bias current supplied to a second light emitting section and a light-output power level of a second light emitting section.
Figure 7:
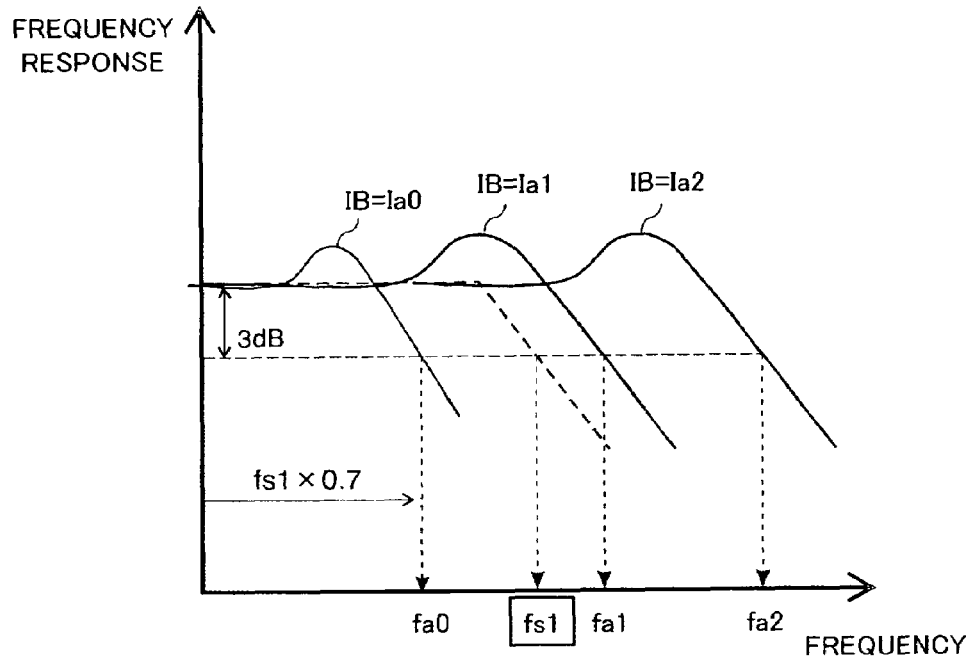
FIG. 7 is a diagram showing a relationship between a frequency response of the first light emitting section and a bias current.
Figure 8:
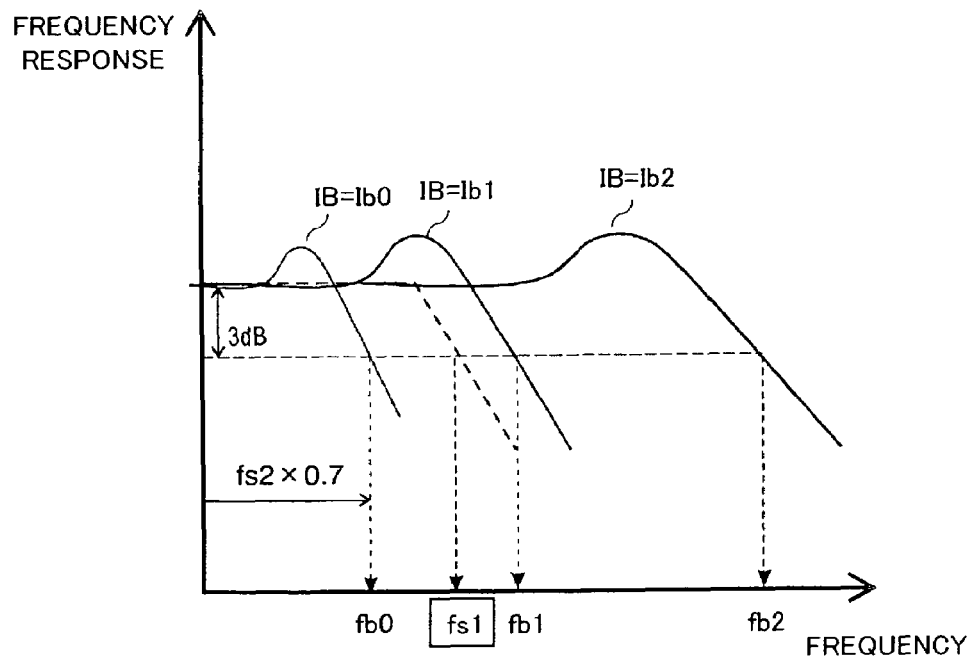
FIG. 8 is a diagram showing a relationship between a frequency response of the second light emitting section and a bias current.

FIG. 5 is a diagram showing a relationship between a bias current supplied to a first light emitting section and a light-output power level of a first light emitting section. FIG. 6 is a diagram showing a relationship between a bias current supplied to a second light emitting section and a light-output power level of the second light emitting section. FIG. 7 is a diagram showing a relationship between a frequency response of the first light emitting section and a bias current. FIG. 8 is a diagram showing a relationship between a frequency response of the second light emitting section and a bias current.

In FIGS. 5 and 6, the light-output power levels of the first light emitting section 131 and the second light emitting section 132 are specified by the bias currents supplied. Here, bias currents supplied when light-output power levels of the first light emitting section 131 are a0, a1, and a2 are Ia0, Ia1, and Ia2, respectively. Bias currents supplied when light-output power levels of the second light emitting section 132 are b0, b1 and b2 are Ib0, Ib1, and Ib2, respectively.

With reference to FIG. 7 and FIG. 8, in general, a semiconductor laser and a light emitting diode have a feature that a frequency response is widened as a bias current IB increases. Therefore, in the present embodiment, a bias current Ia0 corresponding to the light-output power level a0 of the first light emitting section 131 is set so as to satisfy the following formula (5). Here, fa0 is a frequency response of the first light emitting section 131, which is obtained when the bias current is Ia0. And fs1 is a modulation bandwidth of a first driving signal generated by a driver 121.

$$fa0 \geq fs1 \times 0.7 \quad (5)$$

Similarly, a bias current Ib0 corresponding to the light-output power level b0 of the second light emitting section 132 is set so as to satisfy the following formula (6). Here, fb0 is a frequency response of the second light emitting section 132, which is obtained when the bias current is Ib0, and fs2 is a modulation bandwidth of a second driving signal generated by a driver 122.

$$fb0 \geq fs2 \times 0.7 \quad (6)$$

By using the above-mentioned bias setting, compensating the frequency responses of the first light emitting section 131 and the second light emitting section 132 is enabled. Consequently, deterioration in transmission quality due to insufficiency of response bandwidth of the light emitting elements is suppressed. In addition, waveform distortion in the first multilevel optical signal and the second multilevel optical signal and closure of an eye pattern which prominently arises when a light-output power level is minimum are ameliorated, thus reducing influence of intersymbol interference.

A modulation speed of the first multilevel optical signal and a modulation speed of the second multilevel optical signal may be different from each other. When a modulation speed of the first multilevel optical signal and a modulation speed of the second multilevel optical signal are different, it is preferable that a modulation speed of the first multilevel optical signal is K times or 1/K times (K is a natural number) of a modulation speed of the second multilevel optical signal.

Third Embodiment

Figure 9:
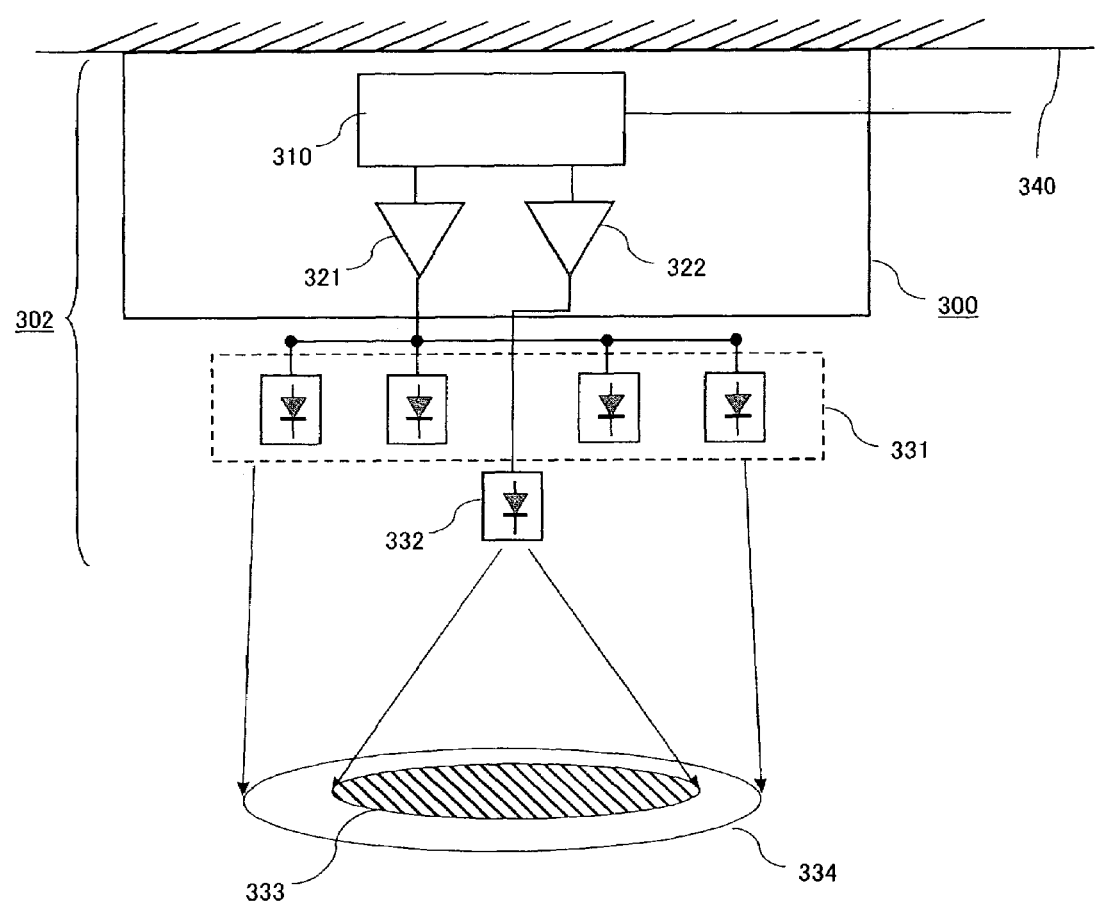
FIG. 9 is a diagram illustrating a schematic configuration of a multilevel optical transmitter according to a third embodiment of the present invention.

FIG. 9 is a diagram showing a schematic configuration of a multilevel optical transmitter according to a third embodiment of the present invention.

An optical transmitter 302 according to the present embodiment is realized as a lighting apparatus or a part thereof, and is used, for example, in a state where the optical transmitter 302 is attached on a ceiling 340. An optical receiver, though not shown, may have functions similar to those of the optical receiver according to the first embodiment. For example, the optical receiver (not shown) is arranged beneath the optical transmitter 302 in a state where the optical receiver is connected to or built into terminal equipment such as a portable computer. The optical receiver receives data transmitted from the optical transmitter 302 by using light emitted from the optical transmitter 302.

The optical transmitter 302 comprises a driving section 300 including a multilevel signal generation section 310 and drivers 321 and 322, a first light emitting section 331, and a second light emitting section 332. The first light emitting section 331 includes a plurality of light emitting elements which output visible light having a light-output power level of an M value in accordance with a driving signal outputted from the driver 321. The second light emitting section 332 includes a semiconductor laser which outputs infrared light having a light-output power level of an N value in accordance with a driving signal outputted from the driver 322.

Figure 10:
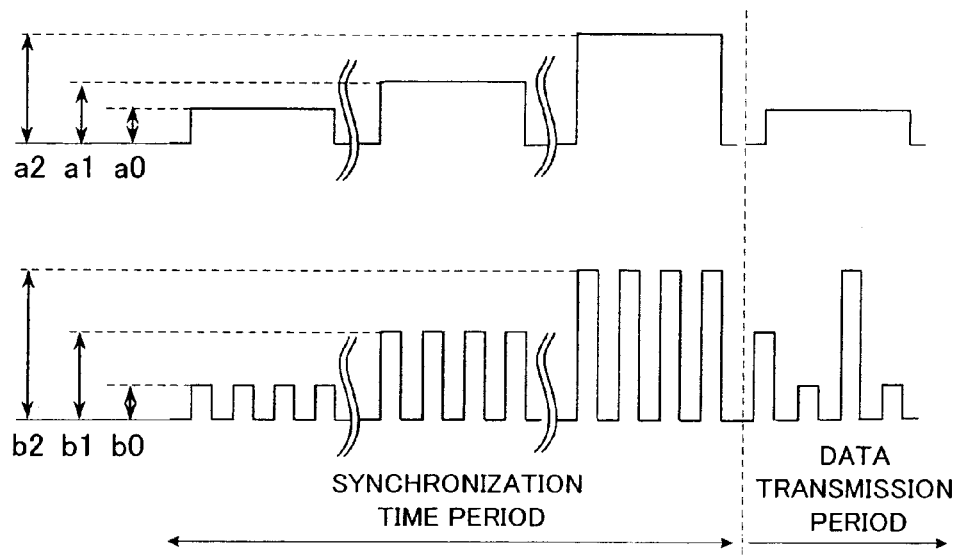
FIG. 10 is a diagram showing an example of a signal outputted by the optical transmitter shown in FIG. 9.
Figure 11:
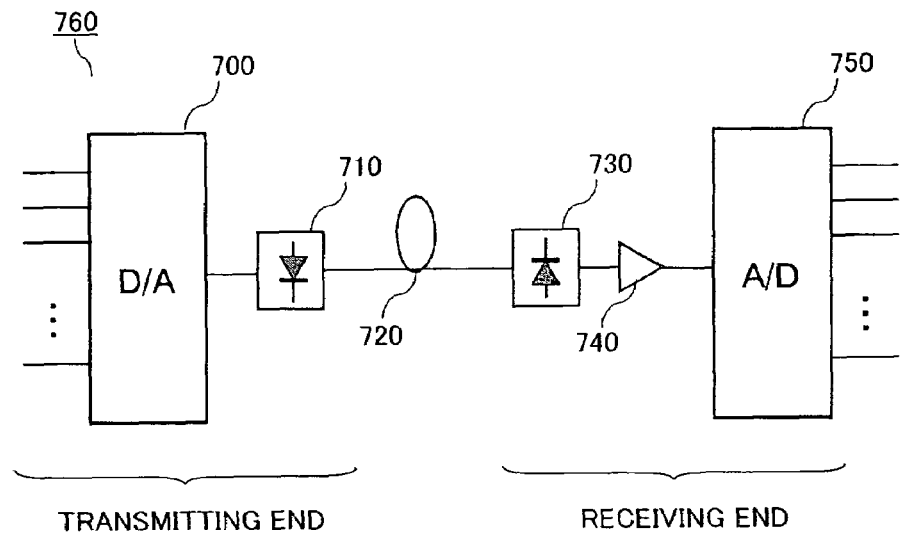
FIG. 11 is a diagram explaining a multilevel optical signal transmission method in which a single light emitting element is used.
Figure 12:
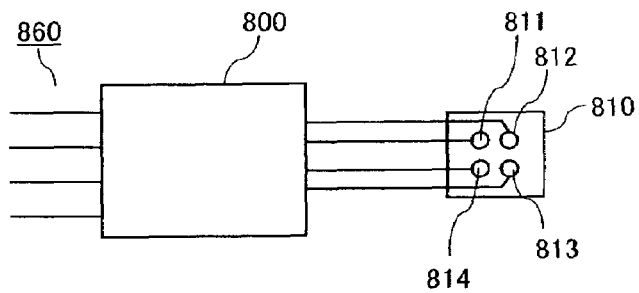
FIG. 12 is a diagram explaining a multilevel optical signal transmission method in which a plurality of light emitting elements.
Figure 13:
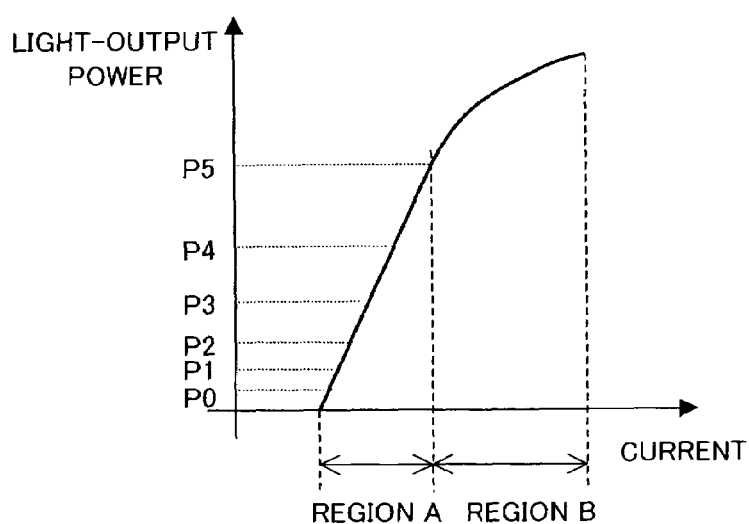
FIG. 13 is a diagram showing a current-light intensity characteristic of a semiconductor laser.

FIG. 10 is a diagram showing an example of a signal outputted by the optical transmitter shown in FIG. 9.

In general, since a response bandwidth of a semiconductor laser is wider than an LED, in the optical transmitter 302 according to the present embodiment, the driving section 300 drives the first light emitting section 331 and the second light emitting section 332 at respectively different speeds. For example, the driving section 300, as shown in FIG. 10, drives the second light emitting section 332 at a modulation speed 4 times of a modulation speed of the first driving section 331. Accordingly, while the first light emitting section 331 transmits a multilevel optical signal once, the second light emitting section 332 outputs a multilevel optical signal 4 times.

In particular, in the present embodiment, a positional relationship between the first light emitting section 331 and the second light emitting section 332 are set so that an irradiation area 333 of the infrared light outputted from the second light emitting section 332 is included within an irradiation area 334 of the visible light outputted from the first light emitting section 331. Specifically, as shown in FIG. 9, the first light emitting section 331 and the second light emitting section 332 may be arranged so that a center axis of the first light emitting section 331 and an optical axis of the second light emitting section 332 match.

A reason why the first light emitting section 331 and the second light emitting section 332 are arranged in such a manner is as follows.

In order to receive data from the optical transmitter 302 according to the present embodiment, it is necessary for a user to arrange the optical receiver at a position where both of the first multilevel optical signal (visible light) and the second multilevel optical signal (infrared light) can be received. However, it is not easy for a user to visually determine whether or not the optical receiver receives the second multilevel light which is the infrared light. Consequently, arrangement of the first light emitting section 331 and the second light emitting section 332 is adjusted in a manner described above so that the second multilevel optical signal functions as guide light roughly showing an irradiation position.

In such a configuration, in order to receive the two multilevel optical signals, a user needs only to arrange the optical receiver within the irradiation area of the visible light beneath the optical transmitter 302, thus enhancing convenience for a user.

As described above, the optical transmitter 302 according to the present embodiment is capable of exhibiting an effect similar to that of the first embodiment. Further, according to the present embodiment, the transmitter having a lighting function and a guide function for adjusting the optical axis, in addition to a data transmission function, can be realized.

In the present embodiment, although the second light emitting section 332 outputs the infrared light, the second light emitting section 332 may output visible light instead of the infrared light.

In addition, in the present embodiment, although a range of light irradiation by the second light emitting section 332 is smaller than a range of light irradiation by the first light emitting section 331, the range of light irradiation by the second light emitting section 332 may be equal to or greater than the range of light irradiation by the first light emitting section 331

The multilevel light transmission system of the present invention is capable of reducing noise in a receiver signal and intersymbol interference caused by waveform distortion and is useful in allowing an optical transmitter to enhance transmission quality.

While the invention has been described in detail, the foregoing description is in all aspects illustrative and not restrictive. It is understood that numerous other modifications and variations can be devised without departing from the scope of the invention.

What is claimed is:

1. An optical transmission system in which data is multilevel-coded and the multilevel-coded data is transmitted, comprising:
   an optical transmitter including:
      a driving section for converting the data to a first multilevel code and a second multilevel code, a difference between the first multilevel code and the second multilevel code being previously assigned to the data;
      a first light emitting section for outputting a first multilevel optical signal having intensity corresponding to the first multilevel code; and
      a second light emitting section for outputting a second multilevel optical signal having intensity corresponding to the second multilevel code; and
   an optical receiver including:
      a first photo-detecting section for receiving the first multilevel optical signal and converting the first multilevel optical signal to a first electrical signal;
      a second photo-detecting section for receiving the second multilevel optical signal and converting the second multilevel optical signal to a second electrical signal; and
      a decoding section for decoding the data which is previously assigned to a difference between the first electrical signal and the second electrical signal.

2. The optical transmission system according to claim 1, wherein
   the first light emitting section intensity-modulates the first multilevel signal using M levels (M is an integer equal to or greater than 3) of light emitting intensity,
   the second light emitting section intensity-modulates the second multilevel signal using N levels (N is an integer equal to or greater than 3) of light emitting intensity, and
   the decoding section detects a difference between an amplitude of the first electrical signal and an amplitude of the second electrical signal.

3. The optical transmission system according to claim 2, wherein
   the first multilevel code is an M level code which has M values (M is an integer equal to or greater than 3), and
   the M values are set so that a difference between any two values selected from the M values is different from each other.

4. The optical transmission system according to claim 3, wherein
   the second multilevel code is an N level code which has N values (N is an integer equal to or greater than 3), and
   the N values are set so that a difference between any two values selected from the N values is different from each other.

5. The optical transmission system according to claim 2, wherein
   the first multilevel code is an M level code which has M values (M is an integer equal to or greater than 3),
   the second multilevel code is an N level code which has N values (N is an integer equal to or greater than 3), and the M values and the N values are set so that a difference between one positive value selected from the M values and one positive value selected from the N values is uniquely defined.

6. The optical transmission system according to claim 1, wherein
the first multilevel optical signal and the second multilevel optical signal are multiplexed;
the receiver further includes a separation section for separating the first multilevel optical signal and the second multilevel optical signal from each other.

7. The optical transmission system according to claim 6, wherein
the first light emitting section emits light having a first wavelength,
the second light emitting section emits light having a second wavelength which is different from the first wavelength, and
the separation section includes
a first wavelength filter, which is arranged so as to cover the first photo-detecting section, for transmitting the light having the first wavelength and
a second wavelength filter, which is arranged so as to cover the second photo-detecting section, for transmitting the light having the second wavelength.

8. The optical transmission system according to claim 7, wherein at least one of the first wavelength and the second wavelength is contained in a visible light area.

9. The optical transmission system according to claim 6, wherein
the first light emitting section emits light having a first polarization plane,
the second light emitting section emits light having a second polarization plane which is perpendicular to the first polarization plane, and
the separation section includes
a first polarization filter, which is arranged so as to cover the first photo-detecting section, for transmitting light having the first polarization plane and
a second polarization filter, which is arranged so as to cover the second photo-detecting section, for transmitting light having the second polarization plane.

10. The optical transmission system according to claim 1, wherein the first light emitting section and the second light emitting section each includes either one of a semiconductor laser and a light emitting diode.

11. The optical transmission system according to claim 1, wherein the driving section drives the first light emitting section and the second light emitting section at modulation speed which are different from each other.

12. An optical transmitter operable to multilevel-code data to be transmitted and to transmit the multilevel-coded data, comprising:
a driving section for converting a first multilevel code and a second multilevel code, a difference between the first multilevel code and the second multilevel code being previously assigned to the data;
a first light emitting section for outputting a first multilevel optical signal having intensity corresponding to the first multilevel code; and
a second light emitting section for outputting a second multilevel optical signal having intensity corresponding to the second multilevel code.

13. An optical receiver operable to receive a first multilevel optical signal and a second multilevel optical signal, comprising:
a first photo-detecting section for receiving the first multilevel optical signal and converting the first multilevel optical signal to a first electrical signal;
a second photo-detecting section for receiving the second multilevel optical signal and converting the second multilevel optical signal to a second electrical signal; and
a decoding section for obtaining a difference between the first electrical signal and the second electrical signal, and for decoding the data which is previously assigned to the difference between the first electrical signal and the second electrical signal.

* * * * *